Figure 1:
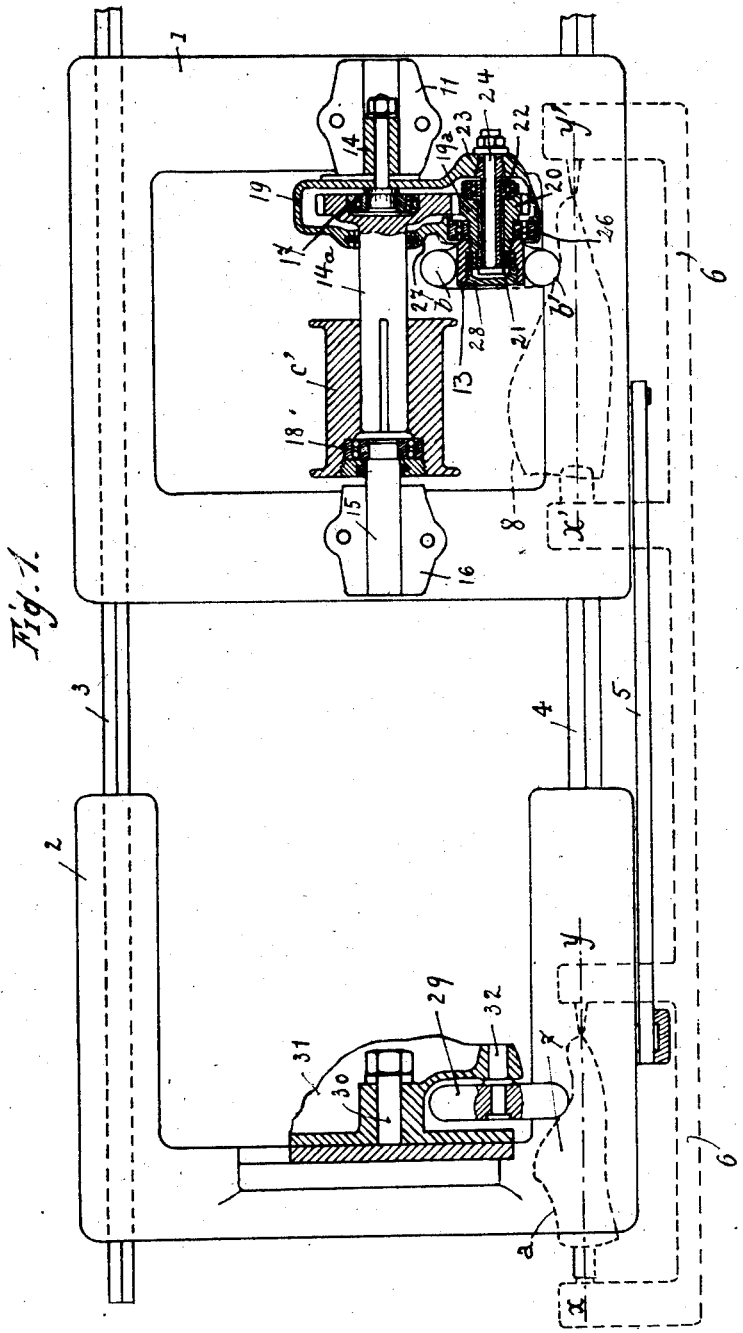

Feb. 21, 1928.  
P. AMANN  
1,659,586  
LAST MAKER'S LATHE  
Filed June 29, 1925  
2 Sheets-Sheet 1

Feb. 21, 1928.

P. AMANN 1,659,586

LAST MAKER'S LATHE

Filed June 29, 1925

2 Sheets-Sheet 2

Patented Feb. 21, 1928.

1,659,586

UNITED STATES PATENT OFFICE.

PAUL AMANN, OF NANTERRE, FRANCE, ASSIGNOR TO UNITED SHOE MACHINERY CORPORATION, OF PATERSON, NEW JERSEY, A CORPORATION OF NEW JERSEY.

LAST-MAKER'S LATHE.

Application filed June 29, 1925, Serial No. 40,434, and in Belgium March 28, 1925.

This invention relates to copying lathes and is illustrated as embodied in a lathe for turning shoe lasts of the type generally set forth in United States Letters Patent No 544,891, granted Aug. 20, 1905, on application of W. F. Gilman.

Last lathes of this type have generally each comprised a model wheel and a cutter head 8 to 10 inches in effective diameter arranged on axes parallel to the direction of feed of the cutter head along the work. The model and work block of such a machine, as fully described in said Letters Patent, have been suspended and rotated in a swing frame or a slide frame which tended to fall toward the model wheel and cutter, and the contact of the model wheel with the rotating model regulated the depth of cut of the cutter in the block. The lathe as thus constructed has been subject to the serious disadvantage that a concavity in the model of less than five inches radius of curvature would be bridged over by the model wheel and not reproduced in its proper depth in the block. It has proved impracticable to reduce the diameters of the model wheel and cutter in the above described arrangement to any substantial degree because projecting portions of the irregularly shaped work block would interfere during the cutting with the driving pulley of the cutter or its supporting bearings.

It is an important object of the present invention to avoid the reproductional difficulty above spoken of by providing an improved machine preserving all the advantages of the parallelism between the cutter axis and the direction of feed, and having a so-called small cutter head, that is, a cutter head of three or four inches effective diameter and a model wheel of corresponding size, rotating on axes parallel to the direction of feed of the cutter, together with operating mechanism so relatively organized as to operate successfully in the manufacture of lasts without being subject to the difficulty of interference, above mentioned.

It is another object of the invention to provide a small cutter head and model wheel mechanism of the character mentioned which can be easily substituted for the ordinary ten-inch cutter head and model wheel in existing machines at small expense.

These objects are accomplished in the illustrated exemplification of the invention by providing a last lathe of the type referred to with a small cutter head of the type mentioned on an axis parallel to the direction of feed, which is driven by toothed gears from a shaft lying entirely behind it out of the reach of any portion of the trimmed or untrimmed work block. Preferably, also, and as illustrated, the shaft which drives the cutter is adapted to be mounted in the same bearings upon the ordinary cutter carriage of the machine as the shaft which it replaces, thus enabling the change from the old form to the new form of the cutter head to be made at minimum expense. The model wheel will preferably be similarly mounted on its carriage.

These and other features of the invention, including certain details of construction and combinations of parts, will be described as embodied in an illustrative machine and pointed out in the appended claims.

Figure 2:
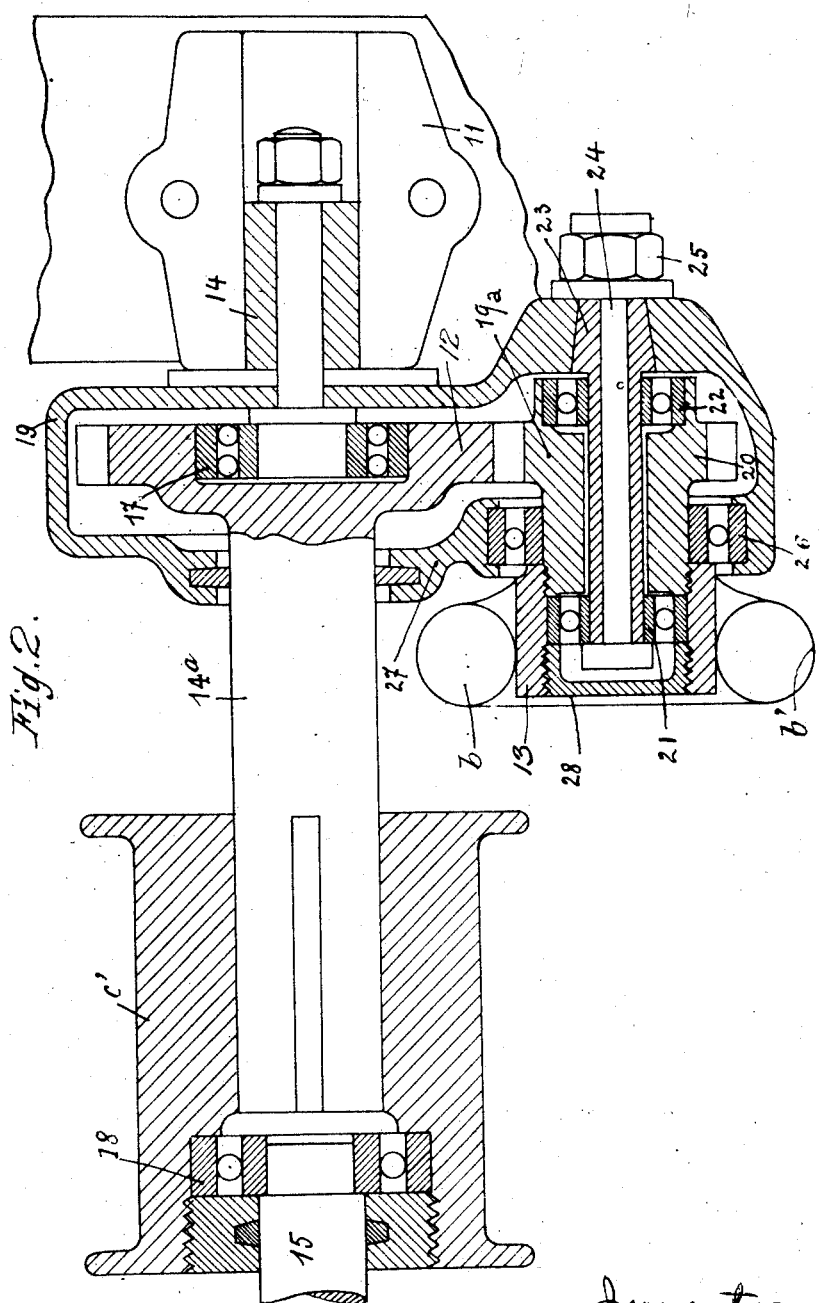

In the drawings,

Fig. 1 shows a plan view of such portions of the machine as are necessary to disclose the invention, and Fig. 2 is an enlarged horizontal sectional view of the cutter head and its driving mechanism.

The cutter carriage 1 and the model wheel carriage 2 are arranged to slide longitudinally of the machine on guides 3 and 4, to enable the model wheel and cutter to operate progressively from one end to the other of the model and block respectively, as will be well understood. They are connected by a length grading mechanism indicated diagrammatically in Fig. 1 by a link 5 and are driven along on the guides 3 and 4 by any convenient power mechanism, not shown. The model 7 and the block 8 are mounted in a swing frame, indicated at 6, to rotate on normally collinear axes $xy$ and $x'y'$. The parts of the illustrated machine above referred to being constructed and arranged as described in said Letters Patent No. 544,891, reference may be had thereto for a more complete disclosure of these parts and of their operation, as well as for a full disclosure of other parts of the illustrated machine not herein fully illustrated or described.

When, as herein illustrated, the present invention is embodied in an existing machine of the type just referred to, the original bearings of the cutter shaft represented by the numerals 11 and 16 may and preferably will be utilized, although, of course, like bearings may readily be bolted on in place of the original bearings. In the illustrated construction, these bearings support stub shafts 14 and 15, respectively, projecting inwardly toward the center of the cutter carriage. Between these stub shafts is mounted the main driving shaft 14ª, which occupies the position of the original cutter shaft. It is supported on the stub shafts preferably by ball bearings 17 and 18 and and carries the drive pulley $c'$.

The stub shaft 14 or the bearing 11 is arranged to support a gear casing or bracket 19. The shaft 14ª carries a pinion 12 which meshes with a pinion 20 carried by means of ball bearings 21 and 22 on a stub shaft 23, 24, mounted in the gear casing 19 by means of a tapered end on the member 23 and a clamp nut 25, as shown. The pinion 20 is made integral with the hollow cutter shaft 19ª on the extremity of which, substantially in line with the ball bearing 21, is mounted the cutter carrier 13 which carries two cutter blades $b$ and $b'$. Thus the machine is provided with a small cutter-head comprising the hollow cutter shaft 19ª, the cutter carrier 13 and the cutter blades $b$, $b'$. A third intermediate ball bearing 26 is located between the cutter shaft 19ª and the outer side 27 of the gear casing 19 in order to provide the necessary strength and steadiness in the cutter shaft.

The effective diameter of the illustrated cutter head is about three inches and a cutter at the portion of its path of movement furthest from the shaft 14ª will ordinarily, as illustrated at $b'$ in Fig. 2, have its working cutting edge five inches from the center of the shaft 14ª to correspond with the working position of the 10-inch cutter head formerly employed. The illustrated apparatus is therefore obviously very compact, and the provision of a third bearing 26 enables comparatively light bearings to be used, if desired. The cover plate 28 is inserted in the head of the cutter shaft 19ª to keep out dirt.

The model wheel 29 is mounted on a stub shaft 32 carried in a bracket 31 which may be mounted upon the arbor 30 upon which the old 10-inch model wheel rotated.

The axis of the drive pulley $c'$ is parallel to the longitudinal axis of the machine, as it was in previous last lathes of the type above referred to, and as the carriage 1 slides along the guides 3 and 4, the drive belt will slip along the long drum which has always been provided in these machines below the cutter head for the purpose of driving it. Thus all the advantage of mechanical simplicity of prior machines is preserved and the additional advantage of a small cutter head with its consequent facility in reproduction of hollows of sharp concavity in the model is secured.

As described, the illustrated cutter head and model wheel mechanism can be inserted in an old-style machine at very small expense, and the usefulness of such a machine, which heretofore has been available only in cutting certain types of lasts, can be greatly broadened.

The mode of operation of the machine is exactly like that of the machine disclosed in the cited patent. The model and block are placed in the swing frame and the model wheel and cutter are traversed over them as they rotate, running in a spiral from one end to the other. The illustrated construction permits the small cutter head and model wheel to reproduce corresponding concavities without mechanical interference between the machine and projecting portions of a last block.

Having thus described my invention, what I claim as new and desire to secure by Letters Patent of the United States is:

1. In a last lathe, a swing frame arranged to carry and to rotate a work piece, a cutter carriage arranged to feed a cutter thereon past the work piece in a direction parallel to the axis of rotation of the work piece in the swing frame, bearings on the cutter carriage arranged to support an old-style 10-inch cutter head shaft parallel to the said direction of feed, a rotatable shaft centered in respect to the said bearings, a gear casing fixedly attached to one of said bearings, a stub shaft rigidly mounted in the gear casing between the first-mentioned shaft and the swing frame and parallel to the first-mentioned shaft, a small cutter head arranged to surround the stub shaft within the gear casing and to project from said casing, said cutter head having cutter blades on its projecting end, a ball bearing between the stud shaft and the cutter head and located at the outer end of the stub shaft substantially in the plane of rotation of the blades, a second ball bearing between the stub shaft and the cutter head and located at the inner end of the stub shaft and a third ball bearing between the cutter head and the gear casing and located between the two above-mentioned bearings, a gear within the gear casing and mounted on the first-mentioned shaft, a pinion within the gear casing and mounted on the cutter head, said pinion meshing with said gear, and a drive pulley on the first-mentioned shaft.

2. A last lathe having, in combination, a cutter carriage, a shaft mounted for rotation in the cutter carriage, a gear casing carried by the cutter carriage, a stub shaft fixed in the gear casing and parallel to the first-mentioned shaft, a small cutter-head surrounding the stub shaft within the gear casing and projecting from said casing, the path of movement of the cutting blades of said cutter-head being substantially in alignment with the projecting end of the stub shaft, a ball bearing located at the outer end of the stub shaft between the stub shaft and the cutter-head and substantially in alignment with the path of rotation of the cutter blades, a second ball bearing located at the inner end of the stub shaft between the stub shaft and the cutter-head, a third ball bearing between the cutter-head and the gear casing, said last-named ball bearing being located between the two above-mentioned bearings and closely adjacent to the path of movement of the cutter blades, a gear within the gear casing rotated with the first-mentioned shaft, and a pinion within the gear casing and fixed to the cutter-head in mesh with and driven by said gear.

In testimony whereof I have signed this specification.

PAUL AMANN.